(12) United States Patent
Shiraga et al.

(10) Patent No.: US 7,436,174 B2
(45) Date of Patent: Oct. 14, 2008

(54) ROTATION ANGLE DETECTOR HAVING DETECTION HEADS DISPOSED PERPENDICULAR TO A ROTOR

(75) Inventors: Shozoh Shiraga, Osaka (JP); Masahide Onishi, Fukui (JP); Yasunori Tomino, Osaka (JP); Tamotsu Ohta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/785,187

(22) Filed: Apr. 16, 2007

(65) Prior Publication Data

US 2008/0018329 A1     Jan. 24, 2008

(30) Foreign Application Priority Data

Jul. 19, 2006    (JP) .............................. 2006-196358

(51) Int. Cl.
*G01B 7/30* (2006.01)
(52) U.S. Cl. .............................. 324/207.25; 324/207.21
(58) Field of Classification Search ............ 324/207.25, 324/207.2, 207.21
See application file for complete search history.

(56) References Cited

U.S. PATENT DOCUMENTS

| | | | |
|---|---|---|---|
| 6,909,282 B2* | 6/2005 | Onishi et al. ............ | 324/207.25 |
| 6,941,241 B2* | 9/2005 | Lee et al. ..................... | 702/151 |
| 7,073,398 B2* | 7/2006 | Kondo et al. ........... | 73/862.326 |
| 2002/0097044 A1* | 7/2002 | Tateishi et al. ......... | 324/207.21 |
| 2005/0258824 A1* | 11/2005 | Uehira et al. .......... | 324/207.25 |

FOREIGN PATENT DOCUMENTS

JP     2005-156163     5/2005

OTHER PUBLICATIONS

Computer translation of Detailed Description section of JP 2005-156163 A into English from Japanese Patent Office Website, printed Dec. 26, 2007, 6 pages.*

* cited by examiner

*Primary Examiner*—Patrick Assouad
*Assistant Examiner*—David M. Schindler
(74) *Attorney, Agent, or Firm*—Wenderoth, Lind & Ponack, L.L.P.

(57) ABSTRACT

The present invention relates to a rotation angle detector for use mainly in detecting rotation angles of a vehicle's steering shaft, with a simplified and low-cost configuration. For this purpose, a first detection head and a second detection head are disposed perpendicularly to a rotor, and a spur gear formed outside the periphery of the first detection head is allowed to engage with a face gear formed on the bottom face of the periphery of the rotor. This can provide the first detection head with a simplified configuration in which magnetic sensors are provided together with a controller on a single circuit board. The configuration enables the rotation angle detector to perform the detection reliably and cheaply.

5 Claims, 3 Drawing Sheets

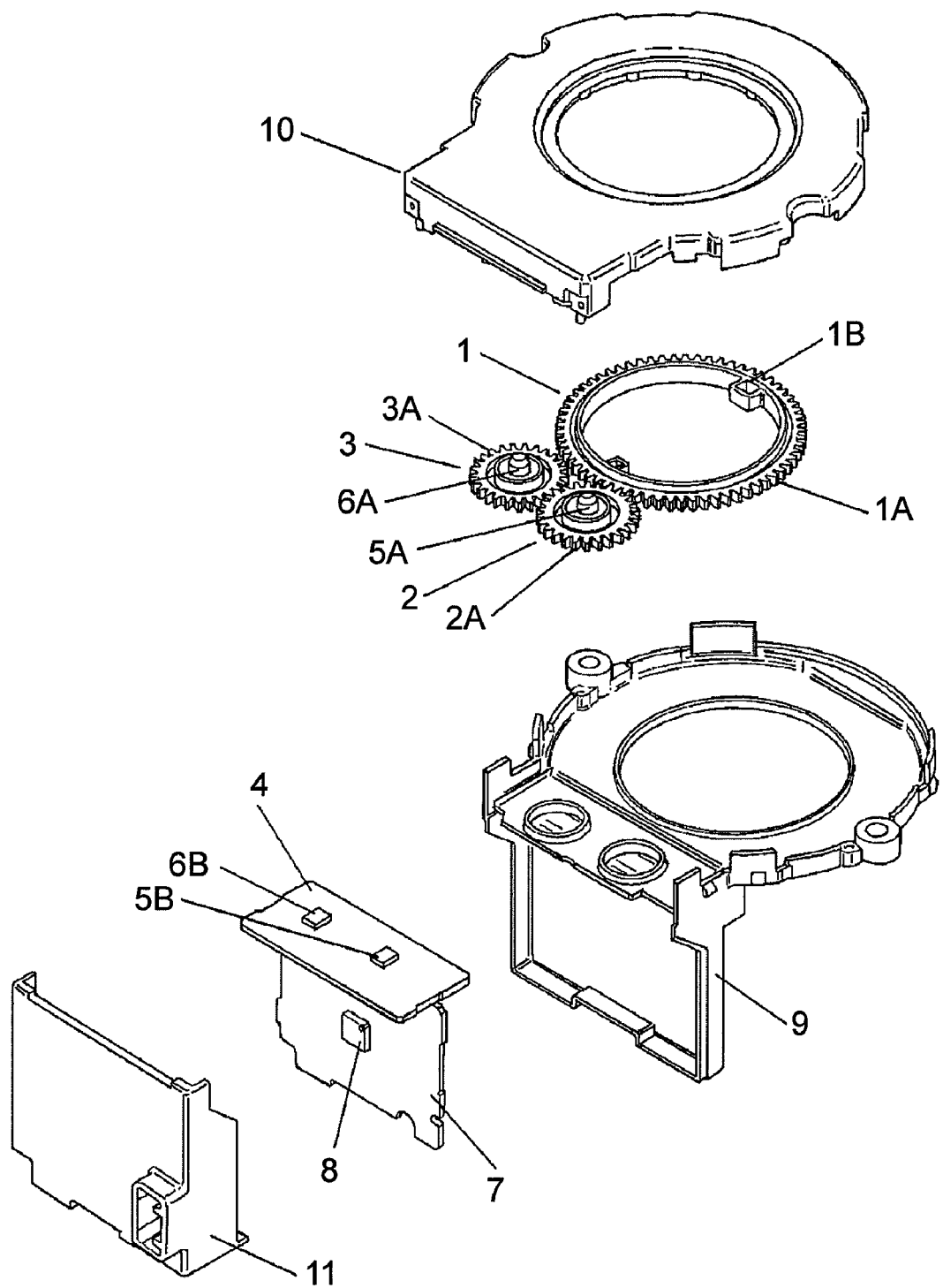
FIG. 3 - PRIOR ART

ROTATION ANGLE DETECTOR HAVING DETECTION HEADS DISPOSED PERPENDICULAR TO A ROTOR

FIELD OF THE INVENTION

The present invention relates to a rotation angle detector for use mainly in detecting a rotation angle of a vehicle steering shaft.

BACKGROUND OF THE INVENTION

Along with recent advances in vehicle technologies, the variety of rotation angle detectors for detecting a rotation angle of a steering shaft has increased to perform various controls in vehicle operation.

A conventional rotation angle detector is described with reference to FIG. 3. FIG. 3 shows an exploded perspective view of a conventional rotation angle detector. Rotor 1 with spur gear 1A formed outside the periphery has key 1B provided inside the periphery to engage with a steering shaft (not shown) that is inserted through rotor 1.

First detection head 2 has spur gear 2A formed outside the periphery and second detection head 3 has spur gear 3A formed outside the periphery with a different number of teeth than spur gear 2A. Spur gear 2A of first detection head 2 engages with spur gear 1A of rotor 1 and, at the same time, spur gear 3A of second detection head 3 engages with spur gear 2A of first detection head 2.

A plurality of wiring patterns (not shown) are formed on the top and bottom surfaces of circuit board 4 disposed below and approximately parallel to first detection head 2 and second detection head 3. Meanwhile, magnetic sensors 5B and 6B are mounted on the surface of circuit board 4 facing magnets 5A and 6A mounted in the center of first detection head 2 and second detection head 3 respectively.

Magnet 5A and magnetic sensor 5B thus facing each other are to form the first detection section, and similarly magnet 6A and magnetic sensor 6B are to form the second detection section.

Circuit board 7 disposed perpendicularly to circuit board 4 and connected via lead wires or the like (not shown) includes electronic components such as microcomputers, thereby forming controller 8 connected to magnetic sensors 5B and 6B.

Cover 10 made of insulation resin covers the top surface of case 9, also made of insulation resin, so as to cover rotor 1, first detection section 2, second detection section 3 and circuit board 4 or the like; and cover 11, similarly made of insulation resin, covers a side surface of case 9, so as to cover circuit board 7 and controller 8 or the like, thus completing the rotation angle detector.

The rotation angle detector with the above configuration is mounted on a vehicle, controller 8 is connected to an electronic circuit (not shown) of the vehicle via a connector (not shown) or the like, and a steering shaft is inserted through the center of rotor 1. Since the steering shaft engages with key 1B, rotor 1 rotates in response to a rotation of the steering shaft.

In the above configuration, upon rotating the steering shaft when driving a vehicle, rotor 1 starts rotating, then first detection head 2 starts rotating in response to rotation of rotor 1, and second detection head 3 starts rotating in response to rotation of first detection head 2 sequentially. Magnets 5A and 6A mounted in the center of the first and second detection heads 2, 3 rotate as well, and accordingly, magnetic sensors 5B and 6B detect changing magnetic force from magnets 5A and 6A as detection signals in voltage waveform including sine waves and cosine waves.

The detection signals are input into controller 8 in waveform in the form of saw-tooth waves. Since first detection head 2 and second detection head 3 differ in number of teeth or rotation speed, the waveforms from first detection head 2 and second detection head 3 differ in frequency cycles, forming phase-shifted detection signals.

Using these two different detection signals from first detection head 2 and second detection head 3 together with the respective numbers of teeth, controller 8 runs a predetermined calculation to detect a rotation angle of rotor 1 or the steering shaft, which is then output into the electronic circuit of the vehicle for use in various controls in vehicle operation.

Other than the configuration as described above in which spur gears formed outside the peripheries engage with each other, some models have tried to dispose first detection head 2 and second detection head 3 perpendicularly to rotor 1 and to mount magnetic sensors 5B and 6B on a single circuit board 7, by using bevel gears for rotor 1 and first detection head 2 engaged with the rotor 1, thus removing circuit board 4 to realize a low-cost configuration.

In this case, however, first detection head 2 needs to be provided with both a bevel gear to engage with rotor 1 and a spur gear to engage with second detection head 3, which causes not only a complicated componentry but also increase in gear engaging points that tends to cause errors easily owing to the clearance between respective gears or so-called backlash.

Japanese Patent Laid-Open Application No. 2005-156163 discloses a known configuration.

However, there have been problems in the above conventional art in that the rotation angle detector has become expensive owing to the use of two circuit boards 4 and 7, and has had design limitations in dimensions when the diameters of first detection head 2 and second detection head 3 have had to be enlarged to increase the number of teeth so as to improve the detection accuracy of the rotation angle.

SUMMARY OF THE INVENTION

To solve the aforementioned problems, the present invention aims at providing a rotation angle detector capable of detecting the rotation angle reliably with a simplified and low-cost configuration.

Therefore, the rotation angle detector of the present invention has the following configuration in which the first and second detection heads are disposed perpendicularly to the rotor, and the spur gear formed on the side periphery of the first detection head is allowed to engage with the gear formed on the bottom of the periphery of the rotor. This can provide the first detection head with a simplified configuration and, at the same time, can form both magnetic sensors and a controller on a single circuit board. The configuration enables the rotation angle detector to detect rotation angles reliably and cheaply.

Moreover, a biasing spring provided allows the rotor to resiliently contact the first detection head, which eliminates the clearance (so-called backlash) between gears of the rotor and the first detection head, enabling the rotation angle detector to perform highly accurate detection without any error.

As described above, the present invention can realize a rotation angle detector capable of reliably detecting rotation angles with a simplified and low-cost configuration.

BRIEF DESCRIPTION OF THE DRAWINGS

FIG. 3 shows an exploded perspective view of a conventional rotation angle detector.

DETAILED DESCRIPTION OF THE EXEMPLARY EMBODIMENTS

Figure 1:
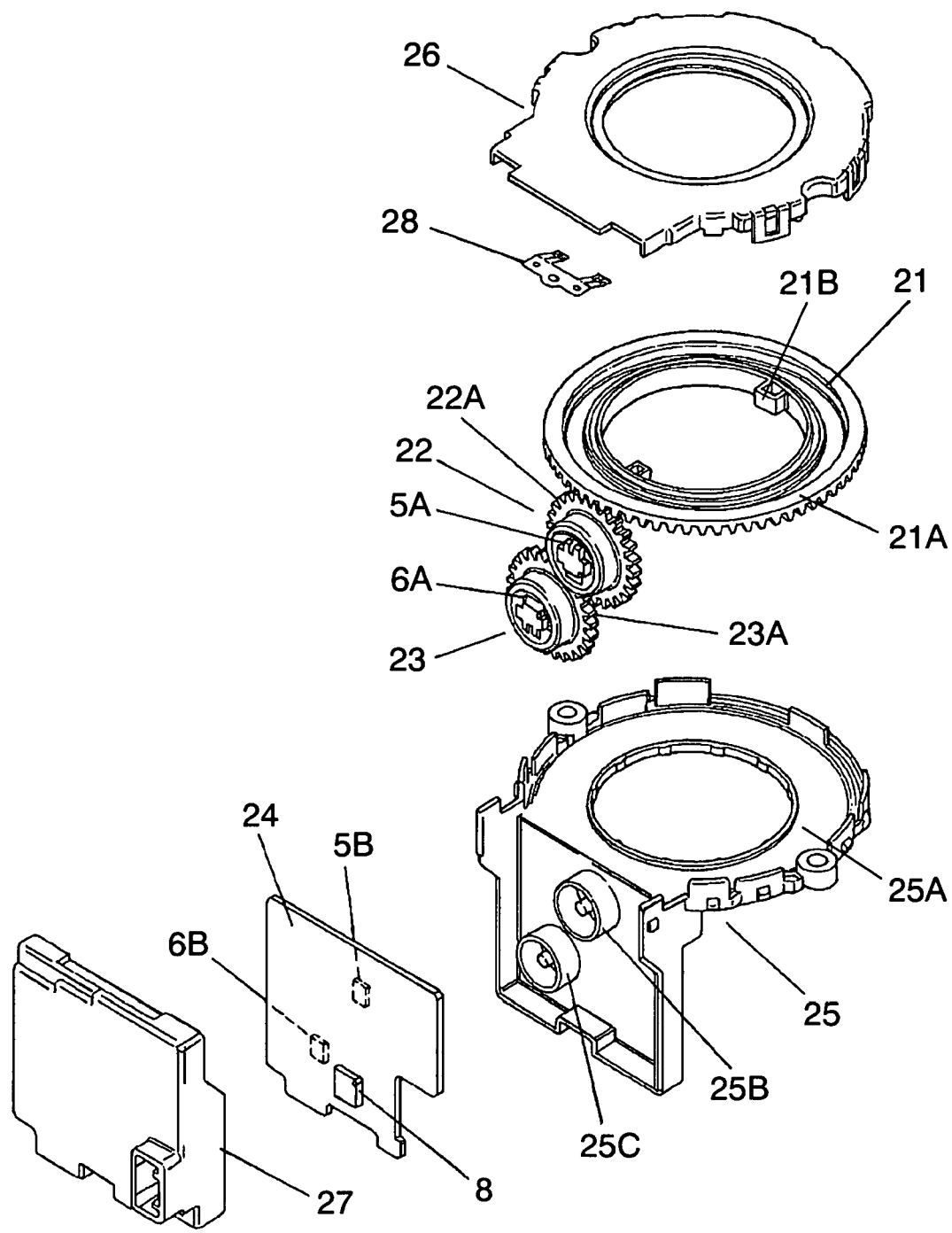
FIG. 1 shows an exploded perspective view of a rotation angle detector used in an exemplary embodiment of the present invention.
Figure 2:
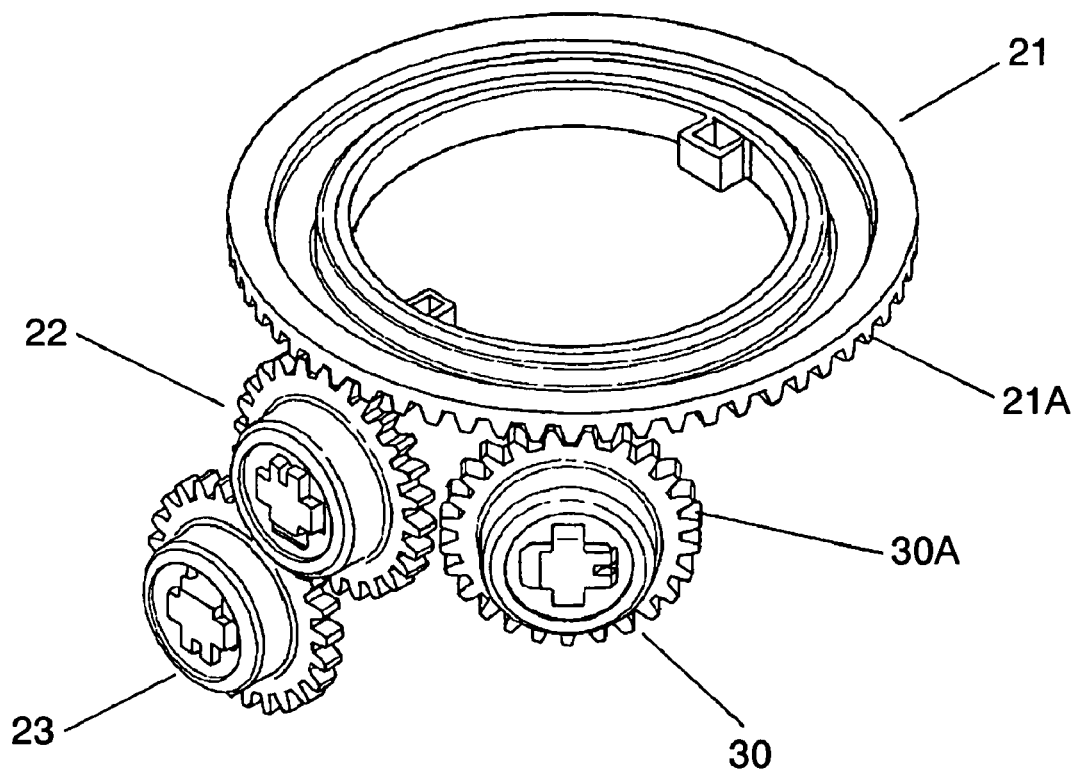
FIG. 2 shows a partial perspective view of a rotation angle detector used in another exemplary embodiment of the present invention.

The exemplary embodiments of the present invention are described now with reference to FIGS. 1 and 2. Elements similar to those described in the background art have the same reference marks and details thereof are described simply.

Exemplary Embodiments

FIG. 1 shows an exploded perspective view of the rotation angle detector used in an exemplary embodiment of the present invention. Rotor 21 made of insulation resin or metal has gear 21A formed on the bottom of the periphery and has key 21B formed inside the periphery to engage with the steering shaft (not shown) that is inserted through rotor 21.

First detection head 22 made of insulation resin or metal and second detection head 23 similarly made of insulation resin or metal are disposed perpendicularly to rotor 21. Spur gear 22A formed outside the periphery of first detection head 22 engages with face gear 21A formed on the bottom face of the periphery of rotor 21. Spur gear 23A formed outside the periphery of second detection head 23 with a different number of teeth than spur gear 22A engages with spur gear 22A of first detection head 22.

A plurality of wiring patterns (not shown) are formed on the top and bottom surfaces of circuit board 24 disposed collaterally and approximately parallel to first detection head 22 and second detection head 23. Magnetic sensors 5B and 6B such as anisotropic magneto-resistive (AMR) elements or the like are fixed by insert molding or the like on a surface facing magnets 5A and 6A fixed in the center of first detection head 22 and second detection head 23 respectively.

Magnet 5A and magnetic sensor 5B both facing each other form the first detection section, and similarly, magnet 6A and magnetic sensor 6B form the second detection section. Controller 8 is formed on circuit board 24, which includes electronic components such as micro-computers and is connected to magnetic sensors 5B and 6B.

Rotor 21 is disposed rotatably in hollow cylinder 25A formed on the top surface of insulation resin case 25. First detection head 22 and second detection head 23 are respectively disposed rotatably in cylinders 25B and 25C formed on a side surface of case 25.

Insulation resin cover 26 covers the top surface of case 25 that houses rotor 21, and similarly, insulation resin cover 27 covers the side surface of case 25 that houses first detection head 22, second detection head 23, circuit board 24 or the like.

Spring 28 made of copper alloy, steel plate or the like is disposed between the bottom surface of cover 26 and the top surface of rotor 21 in a slightly sagged condition to form a biasing spring, causing rotor 21 to contact first detection head 22 resiliently thereby completing the rotation angle detector.

Namely, with first detection head 22 and second detection head 23 disposed perpendicularly to rotor 21, spur gear 22A formed on the side periphery of first detection head 22 is allowed to engage with face gear 21A formed on the bottom face of the periphery of rotor 21. Additionally, the same spur gear 22A is allowed to engage with spur gear 23A formed on the side periphery of second detection head 23, where first detection head 22 can do with only one gear, thus realizing a simplified configuration consequently.

Furthermore, magnetic sensors 5B and 6B, controller 8 or the like are all formed on circuit board 24 disposed an the side of first detection head 22 and second detection head 23, which can reduce the quantity of circuit boards to only one, thereby realizing a low-cost configuration.

The rotation angle detector with the above configuration is mounted on a vehicle, controller 8 is connected to an electronic circuit (not shown) of the vehicle via a connector (not shown) or the like, and a steering shaft is inserted through the center of rotor 21. Since the steering shaft engages with key 21B, rotor 21 rotates in response to a rotation of the steering shaft.

In the above configuration, when the steering shaft is rotated while driving a vehicle, or while the rotation angle detector is in an energized condition, rotor 21 engaged with the steering shaft rotates in response to the rotation of the steering shaft and subsequently first detection head 22, whose spur gear 22A engages with face gear 21A formed on the bottom face of the periphery of rotor 21, starts rotating in response to the rotation of rotor 21. Then, second detection head 23, whose gear 23 A engages with spur gear 22A, starts rotating in response to the rotation of first detection head 22.

Along with rotation of respective detection heads, magnets 5A and 6A mounted in the center of the heads 22, 23 rotate as well and, subsequently, magnetic sensors 5B and 6B detect the changing magnetic intensity from magnets 5A and 6A as detection signals in voltage waveforms including sine waves and cosine waves.

The detection signals are input into controller 8 as approximately saw-tooth waveform data. However, the number of gear teeth or rotation speed differs between first detection head 22 and second detection head 23, causing the waveform data to be phase-shifted due to different frequency cycles between first detection head 22 and second detection head 23.

Using the two different detection signals from first detection head 22 and second detection head 23, and the respective number of teeth, controller 8 runs a predetermined calculation to output a detected rotation angle of rotor 21 or the steering shaft to the electronic circuit of the vehicle, thereby performing various controls in vehicle operation.

At this time, spring 28 is fixed between the bottom surface of cover 26 and the top surface of rotor 21 in a slightly sagged condition, thus forming a biasing spring by which rotor 21 rotates in a condition in which it resiliently contacts first detection head 22. Therefore, the face gear clearance between gear 21A and spur gear 22A or so-called backlash is eliminated thereby allowing the rotation angle detector to perform a highly accurate detection without any error.

First detection head 22 and second detection head 23 are disposed perpendicularly to rotor 21, and the diameters can be enlarged or the number of teeth can be increased relatively easily, which can allow the rotation angle detection to be performed with still higher accuracy.

As described in the exemplary embodiment of the present invention, first detection head 22 and second detection head 23 are disposed perpendicularly to rotor 21. By allowing spur gear 22A formed outside the periphery of first detection head 22 to engage with face gear 21A formed on the bottom face of the periphery of rotor 21, first detection head 22 can be provided with a simplified configuration with only one spur gear 22A. Furthermore, since magnetic sensors 5B and 6B, and controller 8 can be formed on a single circuit board 24, the rotation angle detector can perform the detection reliably and cheaply.

By contacting rotor 21 on first detection head 22 resiliently using biasing spring of spring 28, the clearance between gears of rotor 21 and first detection head 22 or so-called backlash can be eliminated, thereby allowing the rotation angle detector to perform a highly accurate detection without any error.

Moreover, another exemplary embodiment is shown in the partial perspective view in FIG. 2. Auxiliary detection head 30 with spur gear 30A formed outside the periphery is additionally provided. Spur gear 30A is allowed to engage with face gear 21A formed on the bottom face of the periphery of rotor 21, and an auxiliary detection section is provided to detect rotation of auxiliary detection head 30 itself. Controller 8 compares the rotations between auxiliary detection head 30, and first detection head 22 and second detection head 23. If any difference between the detection signals is detected, for instance in a case of a gear out of mesh from rotor 21 or an occurrence of breakage or cracking in either gear of the rotation angle detector, it can prevent erroneous detections of the rotation angle.

The rotation angle detector of the present invention can detect the rotation angle reliably with a simplified and low-cost configuration and is useful mainly to detect the rotation angle of a steering shaft of a vehicle.

The invention claimed is:

1. A rotation angle detector comprising:
   a rotor configured to rotate in response to rotation of a steering shaft, said rotor having first and second opposing faces and an outer peripheral edge;
   a face gear formed on said first face of said rotor;
   a first detection head disposed perpendicular to said rotor;
   a first spur gear formed on an outer peripheral edge of said first detection head, said first spur gear being engaged with said face gear such that said first detection head rotates in response to rotation of said rotor;
   a second detection head disposed perpendicular to said rotor;
   a second spur gear formed on an outer peripheral edge of said second detection head, said second spur gear being engaged with said first spur gear such that said second detection head rotates in response to rotation of said first detection head;
   a first detection section configured to detect rotation of said first detection head;
   a second detection section configured to detect rotation of said second detection head; and
   a controller configured to detect a rotation angle of said rotor according to detection signals output from said first detection section and said second detection section.

2. The rotation angle detector of claim 1, wherein said face gear is formed at an outer periphery of said first face of said rotor.

3. The rotation angle detector of claim 1, further comprising a biasing spring arranged to resiliently press said rotor into contact with said first detection head.

4. The rotation angle detector of claim 1, further comprising
   a case, said rotor and said first and second detection heads being rotatably supported by said case;
   a cover supported by said case and arranged to cover said rotor;
   a biasing spring interposed between said cover and said rotor to resiliently press said rotor into contact with said first detection head.

5. The rotation angle detector of claim 1, further comprising
   an auxiliary detection head disposed perpendicular to said rotor; and
   an auxiliary spur gear formed on an outer peripheral edge of said auxiliary detection head, said auxiliary spur gear being engaged with said face gear such that said auxiliary detection head rotates in response to rotation of said rotor.

* * * * *